United States Patent
Wang et al.

(10) Patent No.: US 9,104,261 B2
(45) Date of Patent: Aug. 11, 2015

(54) METHOD AND APPARATUS FOR NOTIFICATION OF INPUT ENVIRONMENT

(75) Inventors: Kongqiao Wang, Helsinki (FI); Yingfei Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 13/519,583

(22) PCT Filed: Dec. 29, 2009

(86) PCT No.: PCT/CN2009/076208
§ 371 (c)(1),
(2), (4) Date: Jun. 28, 2012

(87) PCT Pub. No.: WO2011/079436
PCT Pub. Date: Jul. 7, 2011

(65) Prior Publication Data
US 2012/0287070 A1    Nov. 15, 2012

(51) Int. Cl.
*G09G 5/00* (2006.01)
*G06F 3/041* (2006.01)
*G06F 3/0488* (2013.01)

(52) U.S. Cl.
CPC .......... *G06F 3/0416* (2013.01); *G06F 3/0488* (2013.01); *H04M 2250/12* (2013.01); *H04M 2250/70* (2013.01)

(58) Field of Classification Search
CPC .............. G06F 3/0416; G06F 3/0488
USPC ................................. 345/156–173
See application file for complete search history.

(56) References Cited

U.S. PATENT DOCUMENTS

| 6,157,505 A * | 12/2000 | Prockup ................. 360/31 |
| 2003/0189586 A1* | 10/2003 | Vronay et al. ............ 345/700 |
| 2005/0154798 A1* | 7/2005 | Nurmi ....................... 710/1 |

FOREIGN PATENT DOCUMENTS

| CN | 1906565 A | 1/2007 |
| CN | 101311881 A | 11/2008 |
| WO | 2011/079437 A1 | 7/2011 |

OTHER PUBLICATIONS

International Search Report and Written Opinion received for corresponding International Patent Application No. PCT/CN2009/076208, dated Oct. 28, 2010, 10 pages.
International Preliminary Report on Patentability for Application No. PCT/CN2009/076208 dated Jul. 4, 2012.

* cited by examiner

*Primary Examiner* — Viet Pham
(74) *Attorney, Agent, or Firm* — Alston & Bird LLP

(57) ABSTRACT

An apparatus, comprising a processor, memory including computer program code, the memory and the computer program code configured to, working with the processor, cause the apparatus to perform at least the following: receiving an indication of an input environment, determining that the input environment negatively affects at least one input mode, determining that the input mode is active, and causing display of an input environment notification is disclosed.

20 Claims, 6 Drawing Sheets

FIGURE 5A
Big
FIGURE 5B
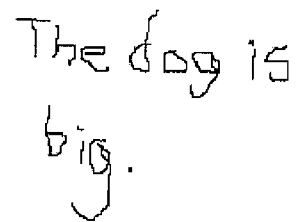
FIGURE 5C
The dog is big.
FIGURE 5D
FIGURE 5E
hello
FIGURE 5F
FIGURE 5G
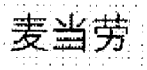
FIGURE 5H

METHOD AND APPARATUS FOR NOTIFICATION OF INPUT ENVIRONMENT

RELATED APPLICATION

This application was originally filed as PCT Application No. PCT/CN2009/076208 filed Dec. 29, 2009.

TECHNICAL FIELD

The present application relates generally to receiving input.

BACKGROUND

There has been a recent surge in the use of electronic devices that receive input based on various input modes.

SUMMARY

Various aspects of examples of the invention are set out in the claims.

An apparatus, comprising a processor, memory including computer program code, the memory and the computer program code configured to, working with the processor, cause the apparatus to perform at least the following: receiving an indication of an input environment, determining that the input environment negatively affects at least one input mode, determining that the input mode is active, and causing display of an input environment notification is disclosed.

A method, comprising receiving an indication of an input environment, determining that the input environment negatively affects at least one input mode, determining that the input mode is active, and causing, by a processor, display of an input environment notification is disclosed.

A computer-readable medium encoded with instructions that, when executed by a computer, perform receiving an indication of an input environment, determining that the input environment negatively affects at least one input mode, determining that the input mode is active, and causing display of an input environment notification is disclosed.

BRIEF DESCRIPTION OF THE DRAWINGS

For a more complete understanding of embodiments of the invention, reference is now made to the following descriptions taken in connection with the accompanying drawings in which:

FIGS. 5A-5H are diagrams illustrating character recognition according to an example embodiment.

DETAILED DESCRIPTION OF THE DRAWINGS

An embodiment of the invention and its potential advantages are understood by referring to FIGS. 1 through 6 of the drawings.

In an example embodiment, a user may be performing input on an apparatus. There may be an environmental factor that negatively impacts the input, such as vibration that may impair writing input. The user may desire to receive notification that the environmental factor may impair the input.

Figure 1A:
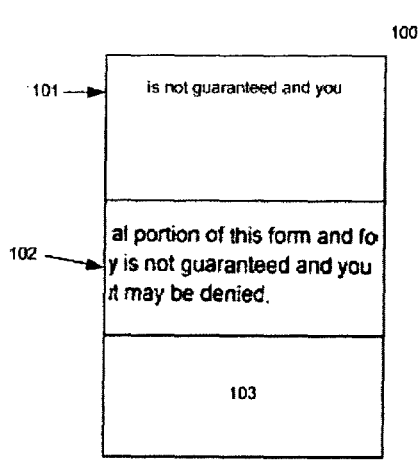
FIGS. 1A-1B are diagrams illustrating input modes according to an example embodiment.
Figure 1B:
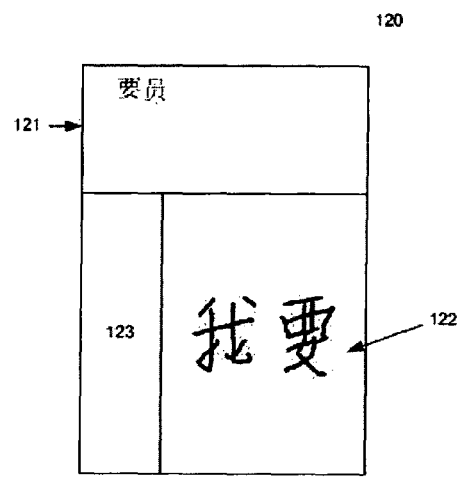

FIGS. 1A-1B are diagrams illustrating input modes according to an example embodiment. The examples of FIGS. 1A-1B indicate the input modes as regions of a display arrangement. The examples of FIGS. 1A-1B are merely examples of input modes, and do not limit the scope of the claims. For example, the region associated with the input mode may vary by position, shape, size, orientation, and/or the like. In an example embodiment, there may be no region of the display arrangement associated with the input mode. For example, the input mode may relate to an external apparatus, such as a keypad, mouse, and/or the like. In another example, the input mode may relate to an audio input mode, such as speech recognition. Even though the examples of FIGS. 1A-1B indicate a text editor region, the display arrangement may not comprise a text editor region. Furthermore, even though the examples of FIGS. 1A-1B indicate a region other than the input mode region and the text editor region, this region may be omitted and/or supplemented by other regions. In the examples of FIGS. 1A-1B, the text editor region may indicate characters that have been input, characters that are comprised in a document being edited, and/or the like. The user may modify edit position, character selection, and/or the like. In the examples of FIGS. 1A-1B, the region that is not designated as a text editor region or an input region may relate to a different input mode region such as a virtual keypad, relate to a window, relate to a different text editor region, relate to information unrelated to input, relate to a group of icons, relate to a group of widgets, and/or the like.

In an example embodiment, input mode relates to touch input mode, non-touch input mode, audio input mode, non-audio input mode, optical input mode, non-optical input mode, and/or the like. Touch input mode may relate to writing recognition, similar as described with reference to FIGS. 5A-5H, keypad input, shape input, and/or the like. Audio input mode may relate to speech recognition, such as, but not limited to, speaker independent speech recognition, speaker dependent recognition, song recognition, and/or the like. Optical input mode may relate to optical character recognition, similar as described with reference to FIGS. 5A-5H, bar code recognition, and/or the like.

In an example embodiment, a display arrangement relates to information caused to be displayed. The information may be displayed on a display comprised by the apparatus, such as display 28 of FIG. 6, on a display external to the apparatus, such as a monitor, and/or the like.

FIG. 1A is a diagram illustrating an optical input mode, such as optical character recognition, according to an example embodiment. In the example of FIG. 1A, display arrangement 100 comprises text editor region 101, optical input mode region 102, and region 103. The information indicated in optical input mode region 102 may relate to information from a camera, scanner, a stored image, a received image, and/or the like. Determination of characters based on the information may be similar as described with reference to FIGS. 5A-5H. Text editor region 101 indicates 4 words comprising characters. The characters may relate to existing text, text associated with input, and/or the like. For example, the apparatus may cause the character input associated with input region 102 to be displayed in text editor region.

FIG. 1B is a diagram illustrating a touch input mode, such as writing recognition, according to an example embodiment.

In the example of FIG. 1B, display arrangement 120 comprises text editor region 121, touch input mode region 122, and region 123. Touch input mode region 122 indicates two written characters. The characters may have been written according to received input, such as a touch input. The determination of characters based on the writing input may be similar as described with reference to FIGS. 5A-5H. Text editor region 121 indicates 2 characters. The characters may relate to existing text, text associated with input, and/or the like. For example, the apparatus may cause the character input associated with input region 122 to be displayed in text editor region.

FIGS. 2A-2E are diagrams illustrating input environment notification according to an example embodiment. The examples of 2A-2E are merely examples of input environment notification, and do not limit the scope of the claims. For example, input environment notification may comprise non-visual notification, such as audio notification, tactile notification, and/or the like. In an example embodiment, an input environment relates to one or more factors surrounding the apparatus and/or the user that may interfere with the apparatus's ability to accurately determine the input it receives. Without limiting the scope of the claims in any way, technical effects of input environment notification may include providing user information regarding input environment that may negatively affect input, providing the user with an opportunity to correct input environment in order to improve input, and allowing the user to postpone input until the input environment becomes a lesser negative affect on input.

In an example embodiment, an input environment exhibiting motion, such as vibration, may negatively affect an optical input mode, a touch input mode, and/or the like. The motion may be a result of using the device while on a moving vehicle, while performing a physical activity, and/or the like. Input environment related to motion may be determined using a motion sensor, a position sensor, an optical sensor, and/or the like. Such sensor information may be obtained continuously, periodically, randomly, and/or the like, throughout the operation of the apparatus, when an input mode is used, and/or the like. Input environment related to motion may be received with corresponding input. For example, optical recognition may provide information indicating an input environment exhibiting motion.

In an example embodiment, an input environment exhibiting background noise, such as, but not limited to, vehicle noises, kitchen noises, wind, and background conversations, may negatively affect an audio input mode. The background noise may be a result of using the device while on a moving vehicle, while performing a physical activity, while outdoors, while in a restaurant, and/or the like. Input environment related to background noise may be determined using a microphone or something similar. Such sensor information may be obtained continuously, periodically, randomly, and/or the like, throughout the operation of the apparatus, when an input mode is used, and/or the like. Input environment related to background noise may be received with corresponding input. For example, speech recognition may provide information indicating an input environment exhibiting background noise.

In an example embodiment, an input environment exhibiting poor lighting condition, such as, but not limited to, a poorly lit room and darkness of night, may negatively affect an optical input mode. Input environment related to lighting condition may be determined using a camera, light sensor, and/or the like. Such sensor information may be obtained continuously, periodically, randomly, and/or the like, throughout the operation of the apparatus, when an input mode is used, and/or the like. Input environment related to lighting condition may be received with corresponding input. For example, optical recognition may provide information indicating an input environment exhibiting poor lighting condition.

In an example embodiment, an input environment notification may comprise a textual input environment notification and/or a non-textual input environment notification. A textual input environment notification may comprise characters indicating to that an input environment is negatively affecting input. The textual input environment notification may comprise information indicating merely that there is a negative impact, information indicating the input environmental condition, information recommending corrective action, and/or the like. A non-textual input environment notification may relate to modifying shading, lighting, color, and/or the like, of at least part of the display. The modification of shading, lighting, color, and/or the like, may relate to background or foreground. For example, the shading may relate to the background of a region, such as the fill of a region. In another example, the shading may relate to the foreground of a region, such as a font, image, and/or the like. Without limiting the scope of the claims in any way, some examples of a textual input environment notification can provide the user with a notification that can explain its relevance to a user. In further example, a non-textual input environment notification may provide a user with a notification that may be perceived independently of text. Some example may provide the technical effect of reducing time associated with reading a textual input environment notification.

In an example embodiment, the apparatus may receive information indicating the magnitude of the negative affect of the input environment. For example, the apparatus may receive information regarding the intensity of motion, frequency of motion, level of background noise, level of light, and/or the like. In such an embodiment, the input environment notification may indicate the magnitude. For example, a textual input environment notification may indicate magnitude using adjectives. In another example, a non-textual input environment may vary the level of shading, lighting, coloring, and/or the like, in proportion to the magnitude. For example, a background may be shaded lightly to indicate a low magnitude negative affect. In another example, a background may be shaded heavily to indicate a high magnitude negative affect. In yet another example lighting associated with an input region may be moderately dimmed to indicate a moderate magnitude negative affect. In still another example, a non-textual input environment indicator may relate to a meter that may indicate a scale. In such an example, the scale of the meter may indicate the magnitude.

The input environment notification may relate to the entirety of the display arrangement or a part of the display arrangement. For example, the input environment notification may relate to the input region to which it applies. In another example, the input environment notification may relate to all input regions of a display arrangement. In still another example, the input environment notification may relate to a text editor to which input is being provided.

Figure 2A:
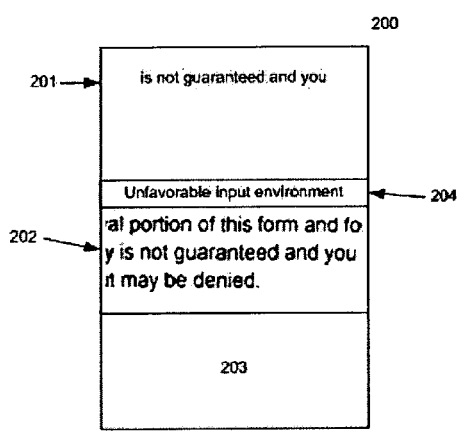
FIGS. 2A-2E are diagrams illustrating input environment notification according to an example embodiment.

FIG. 2A is a diagram illustrating input environment notification according to an example embodiment. In the example of FIG. 2A, display arrangement 200 comprises text editor region 201, optical input mode region 202, region 203, and textual input environment notification 204. Textual input environment notification 204 provides mere indication of a negative affect of input environment. Textual input environment notification 204 relates to a part of optical input region 202. In the example of FIG. 2A, the input environment may relate to motion, lighting condition, and/or the like.

Figure 2B:
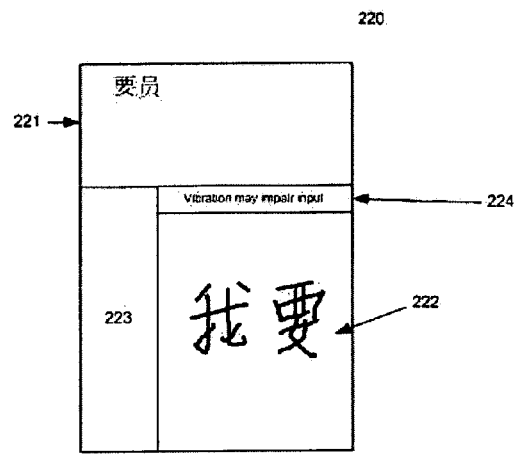

FIG. 2B is a diagram illustrating input environment notification according to an example embodiment. In the example of FIG. 2B, display arrangement 220 comprises text editor region 221, touch input mode region 222, region 223, and textual input environment notification 224. Textual input environment notification 224 provides indication of the input environment causing the negative effect. Textual input environment notification 224 relates to a part of optical input region 222. In the example of FIG. 2B, the input environment relates to vibration.

Figure 2C:
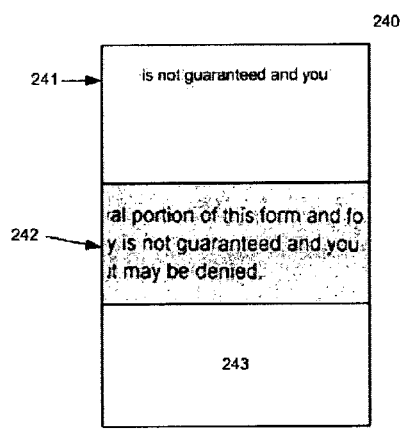

FIG. 2C is a diagram illustrating input environment notification according to an example embodiment. In the example of FIG. 2C, display arrangement 240 comprises text editor region 241, optical input mode region 242, region 243, and a non-textual input environment notification applied to optical input mode region 242. The non-textual input environment notification of optical input mode region 242 relates to background shading and/or lighting. In the example of FIG. 2C, the level of shading and/or lighting may indicate magnitude of the negative affect of the input environment. For example, the moderate level of shading may indicate a moderate magnitude of negative affect. In the example of FIG. 2C, the input environment may relate to motion, lighting condition, and/or the like.

Figure 2D:
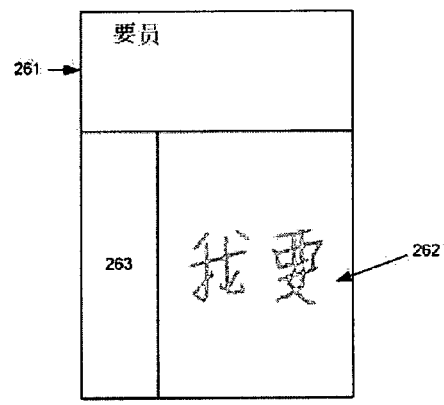

FIG. 2D is a diagram illustrating input environment notification according to an example embodiment. In the example of FIG. 2D, display arrangement 260 comprises text editor region 261, touch input mode region 262, region 263, and a non-textual input environment notification applied to touch input mode region 262. The non-textual input environment notification of touch input mode region 262 relates to foreground shading and/or lighting. In the example of FIG. 2C, the level of shading and/or lighting may indicate magnitude of the negative affect of the input environment. For example, the light shading of the writing input may indicate a large magnitude of negative affect. In the example of FIG. 2C, the input environment may relate to motion, lighting condition, and/or the like.

Figure 2E:
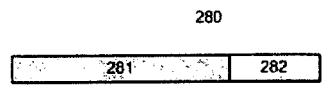

FIG. 2E is a diagram illustrating a non-textual meter input environment notification 280. The relation between shaded region 281 and non-shaded region 282 may indicate the magnitude of the negative affect. The non-textual input environment notification 280 may be positioned in relation to an input region associated with the input environment, all input regions, a separate region, and/or the like. The representation of the meter may vary. For example, the meter may vary by shape, size, orientation, and/or the like. In another example, the magnitude may be indicated by a representation other than shading, in addition to shading, and/or the like. In such an example, the representation may comprise a sliding element, a pointing element, and/or the like.

Figure 3:
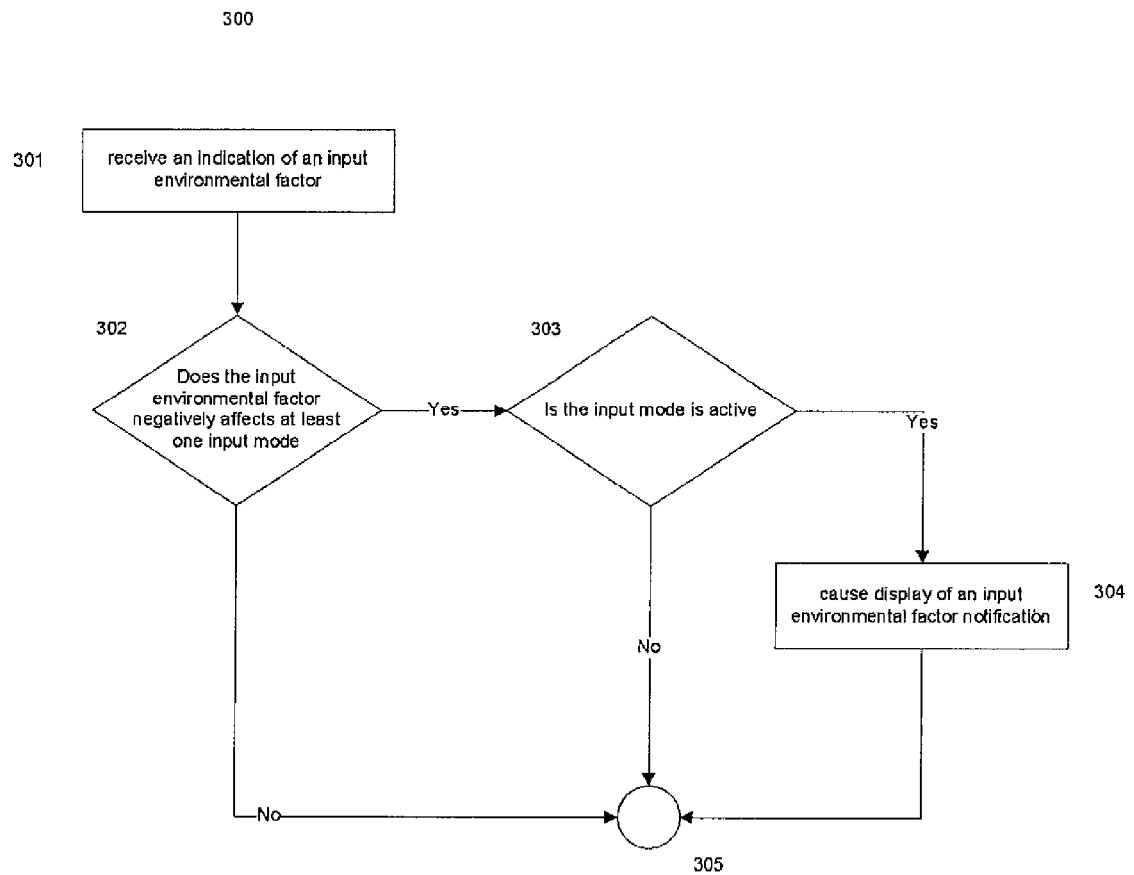
FIG. 3 is a flow diagram showing a set of operations for notification of input environment according to an example embodiment.
Figure 6:
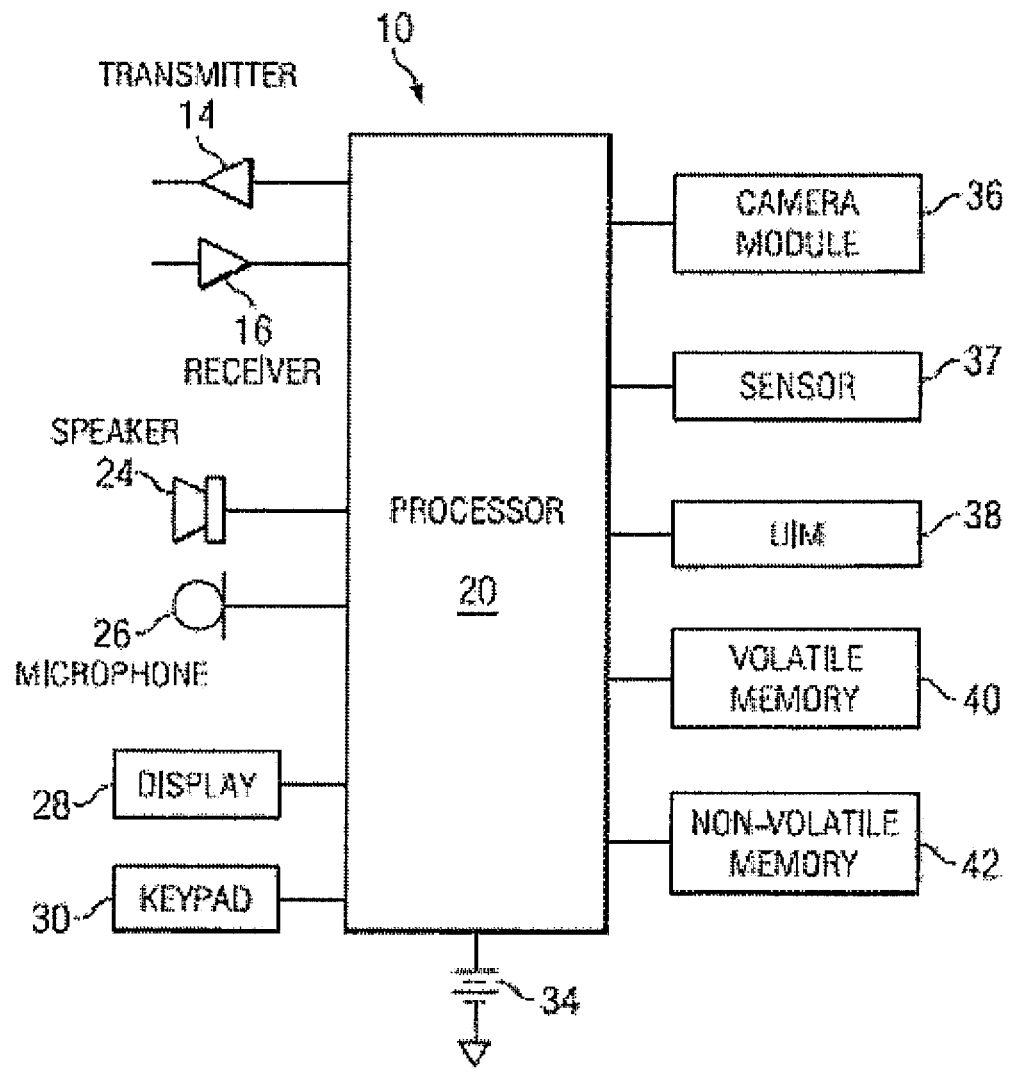
FIG. 6 is a block diagram showing an apparatus according to an example embodiment.

FIG. 3 is a flow diagram showing a set of operations 300 for notification of input environment according to an example embodiment. An apparatus, for example electronic device 10 of FIG. 6 or a portion thereof, may utilize the set of operations 300. The apparatus may comprise means, including, for example processor 20 of FIG. 6, for performing the operations of FIG. 3. In an example embodiment, an apparatus, for example device 10 of FIG. 6, is transformed by having memory, for example memory 42 of FIG. 6, comprising computer code configured to, working with a processor, for example processor 20 of FIG. 6, cause the apparatus to perform set of operations 300.

At block 301, the apparatus receives an indication of an input environment similarly as described with reference to FIGS. 2A-2E.

At block 302, the apparatus determines whether the input environment negatively affects at least one input mode similarly as described with reference to FIGS. 2A-2E. If the apparatus determines that the input environment negatively affects the input mode, the flow proceeds to block 303. Otherwise, the flow exits at block 305.

At block 303, the apparatus determines whether the input mode is active. For example, determination that the input mode is active may relate to presence of a region associated with the input mode on the display arrangement. In another example, determination that the input mode is active may relate to the apparatus receiving input associated with the input mode. If the apparatus determines that the input mode is active, flow proceeds to block 304. Otherwise, the flow exits at block 305.

At block 304, the apparatus causes display of an input environment notification based at least in part on the input mode and the input environment similarly as described with reference to FIGS. 2A-2E, for example on display 28 of FIG. 6.

Figure 4:
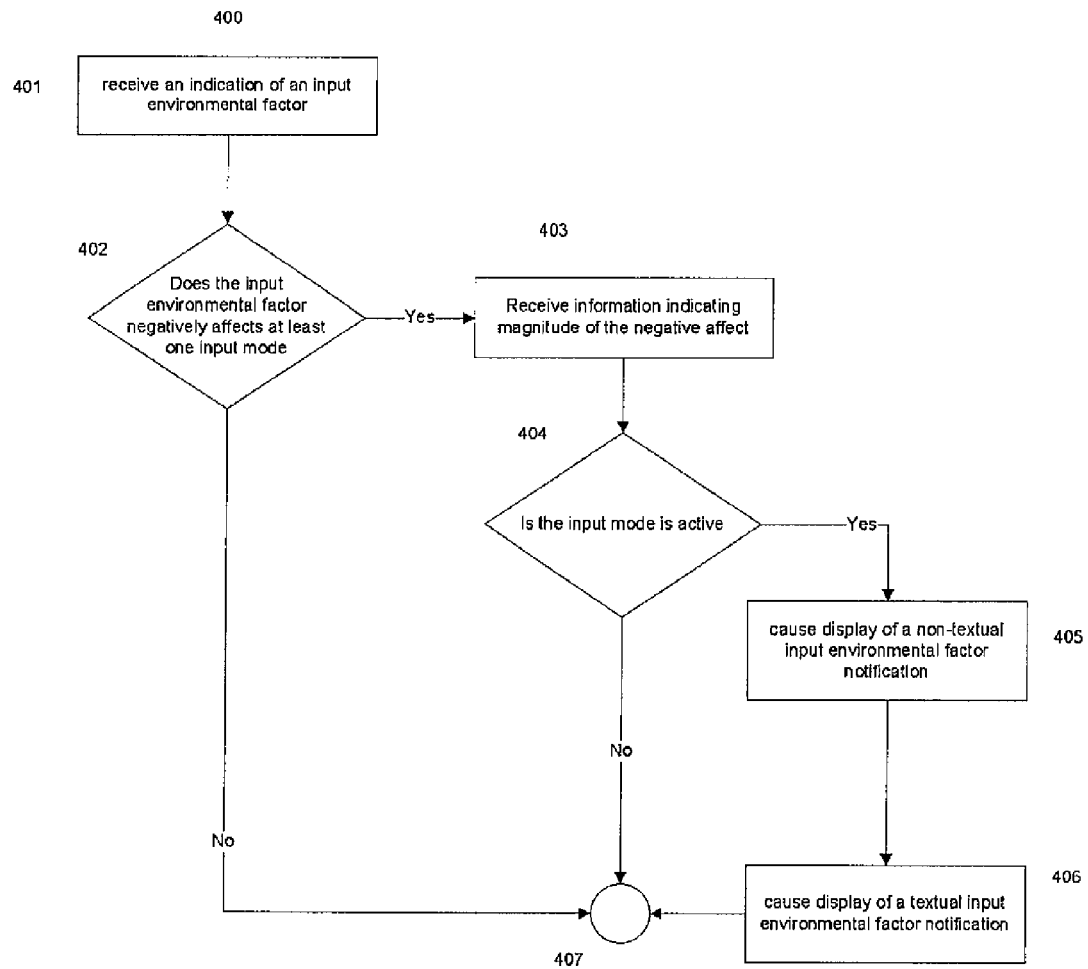
FIG. 4 is a flow diagram showing a set of operations for notification of input environment according to an example embodiment.

FIG. 4 is a flow diagram showing a set of operations 400 for notification of input environment according to an example embodiment. An apparatus, for example electronic device 10 of FIG. 6 or a portion thereof, may utilize the set of operations 400. The apparatus may comprise means, including, for example processor 20 of FIG. 6, for performing the operations of FIG. 4. In an example embodiment, an apparatus, for example device 10 of FIG. 6, is transformed by having memory, for example memory 42 of FIG. 6, comprising computer code configured to, working with a processor, for example processor 20 of FIG. 6, cause the apparatus to perform set of operations 400.

At block 401, the apparatus receives an indication of an input environment similarly as described with reference to FIGS. 2A-2E.

At block 402, the apparatus determines whether the input environment negatively affects at least one input mode similarly as described with reference to FIGS. 2A-2E. If the apparatus determines that the input environment negatively affects the input mode, the flow proceeds to block 403. Otherwise, the flow exits at block 407.

At block 403, the apparatus receives information indicating magnitude of the negative affect. The apparatus may receive the information separately from, or in conjunction with the input environment. The information indicating magnitude of the negative affect may be similar as described with reference to FIGS. 2A-2E.

At block 404, the apparatus determines whether the input mode is active. For example, determination that the input mode is active may relate to presence of a region associated with the input mode on the display arrangement. In another example, determination that the input mode is active may relate to the apparatus receiving input associated with the input mode. If the apparatus determines that the input mode is active, flow proceeds to block 405. Otherwise, the flow exits at block 407.

At block 405, the apparatus causes display of a non-textual input environment notification based at least in part on the input mode and the input environment similarly as described with reference to FIGS. 2A-2E, for example on display 28 of FIG. 6.

At block 406, the apparatus causes display of a textual input environment notification based at least in part on the input mode and the input environment similarly as described with reference to FIGS. 2A-2E, for example on display 28 of FIG. 6.

FIGS. 5A-5H are diagrams illustrating character recognition according to an example embodiment. The examples of FIGS. 5A-5H are merely examples of character recognition, and do not limit the scope of the claims. For example, character images may vary with respect to language, characters, orientation, size, alignment, and/or the like. The characters may relate to Arabic characters, Latin characters, Indic characters, Japanese characters, and/or the like.

In an example embodiment, a character image relates to graphical information that represents at least one character. For example, a character image may relate to an image of a written word. A character image may relate to a part and/or the entirety of an image. The character image may relate to one or more written characters, copied characters, photographed characters, scanned characters, and/or the like.

In an example embodiment, at least one character may be determined based, at least in part on the character image. For example, an apparatus may perform writing recognition, continuous handwriting recognition, optical character recognition (OCR), and/or the like on a character image to determine one or more characters. The accuracy of determination of the at least one character may vary across apparatuses and does not limit the claims set forth herein. For example, a first apparatus may have less accurate OCR than a second apparatus.

FIG. 5A is a diagram illustrating character recognition according to an example embodiment. In the example of FIG. 5A, the character image represents three letters that form the word "Big."

FIG. 5B is a diagram of recognized characters represented by the character image of FIG. 5A. The characters may be determined by an apparatus, such as electronic device 10 of FIG. 8. In the example of FIG. 5B, the characters are "Big."

FIG. 5C is a diagram illustrating a character image according to an example embodiment. In the example of FIG. 5C, the character image represents letters and punctuation that form "The dog is big."

FIG. 5D is a diagram of characters represented by the character image of FIG. 5C. The characters may be determined by an apparatus, such as electronic device 10 of FIG. 8. In the example of FIG. 5B, the characters are "The dog is big."

FIG. 5E is a diagram illustrating a character image according to an example embodiment. In the example of FIG. 5E, the character image represents five script letters that for the word "hello."

FIG. 5F is a diagram of characters represented by the character image of FIG. 5E. The characters may be determined by an apparatus, such as electronic device 10 of FIG. 8. In the example of FIG. 5F, the characters are "hello."

FIG. 5G is a diagram illustrating a character image according to an example embodiment. In the example of FIG. 5G, the character image represents three letters that form the word "麦当劳".

FIG. 5H is a diagram of characters represented by the character image of FIG. 5G. The characters may be determined by an apparatus, such as electronic device 10 of FIG. 8. In the example of FIG. 5H, the characters are "麦当劳".

FIG. 6 is a block diagram showing an apparatus, such as an electronic device 10, according to an example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-6. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-6. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-6. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. Display 28 may be display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-6. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 6 illustrates an example of an electronic device that may utilize embodiments of the invention including those described and depicted, for example, in FIGS. 1-6, electronic device 10 of FIG. 6 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 6. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 302 of FIG. 3 may be performed after block 303. Furthermore, if desired, one or more of the above-described functions may be optional or may be combined. For example, block 403 of FIG. 4 may be optional or combined with block 401.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one a processor;
   at least one memory including computer program code, the memory and the computer program code configured to, working with the processor, cause the apparatus to perform at least the following:
   receiving an indication of an input environment;
   determining that the input environment negatively affects at least one input mode;
   determining that the input mode is active; and
   causing display of an input environment notification message based at least in part on the input mode and the input environment, wherein the input environment notification message comprises at least a textual message.

2. The apparatus of claim 1, wherein the input environment relates to motion.

3. The apparatus of claim 2, wherein the motion relates to vibration.

4. The apparatus of claim 1, wherein the input environment relates to background noise.

5. The apparatus of claim 1, wherein the input environment relates to a lighting condition.

6. The apparatus of claim 1, wherein the input mode relates to an audio input mode.

7. The apparatus of claim 1, wherein the input mode relates to an optical input mode.

8. The apparatus of claim 1, wherein the input mode relates to a touch input mode.

9. The apparatus of claim 1, wherein the memory and the computer program code are further configured to, working with the processor, cause the apparatus to perform receiving information indicating magnitude of the negative affect.

10. The apparatus of claim 9, wherein the input environment notification message indicates the magnitude of the negative affect.

11. The apparatus of claim 1, wherein the input environment notification message comprises a non-textual input environment notification.

12. The apparatus of claim 11, wherein the non-textual input environment notification message comprises causing dimming of at least part of a display.

13. The apparatus of claim 12, wherein the non-textual input environment notification message comprises a meter.

14. The apparatus of claim 12, wherein the non-textual input environment notification message comprises causing shading of at least part of a display.

15. The apparatus of claim 14, wherein the shading relates to background shading.

16. The apparatus of claim 14, wherein the shading relates to foreground shading.

17. The apparatus of claim 1, wherein the input environment notification message comprises a textual input environment notification.

18. A method, comprising:
receiving an indication of an input environment;
determining that the input environment negatively affects at least one input mode;
determining that the input mode is active; and
causing, by a processor, display of an input environment notification message based at least in part on the input mode and the input environment, wherein the input environment notification message comprises at least a textual message.

19. A non-transitory computer-readable medium encoded with instructions that, when executed by an apparatus, cause the apparatus to perform:
receiving an indication of an input environment;
determining that the input environment negatively affects at least one input mode;
determining that the input mode is active; and
causing display of an input environment notification message based at least in part on the input mode and the input environment, wherein the input environment notification message comprises at least a textual message.

20. The apparatus according to claim 1, wherein the input environment notification message comprises a corrective action.

* * * * *